Figure 1:
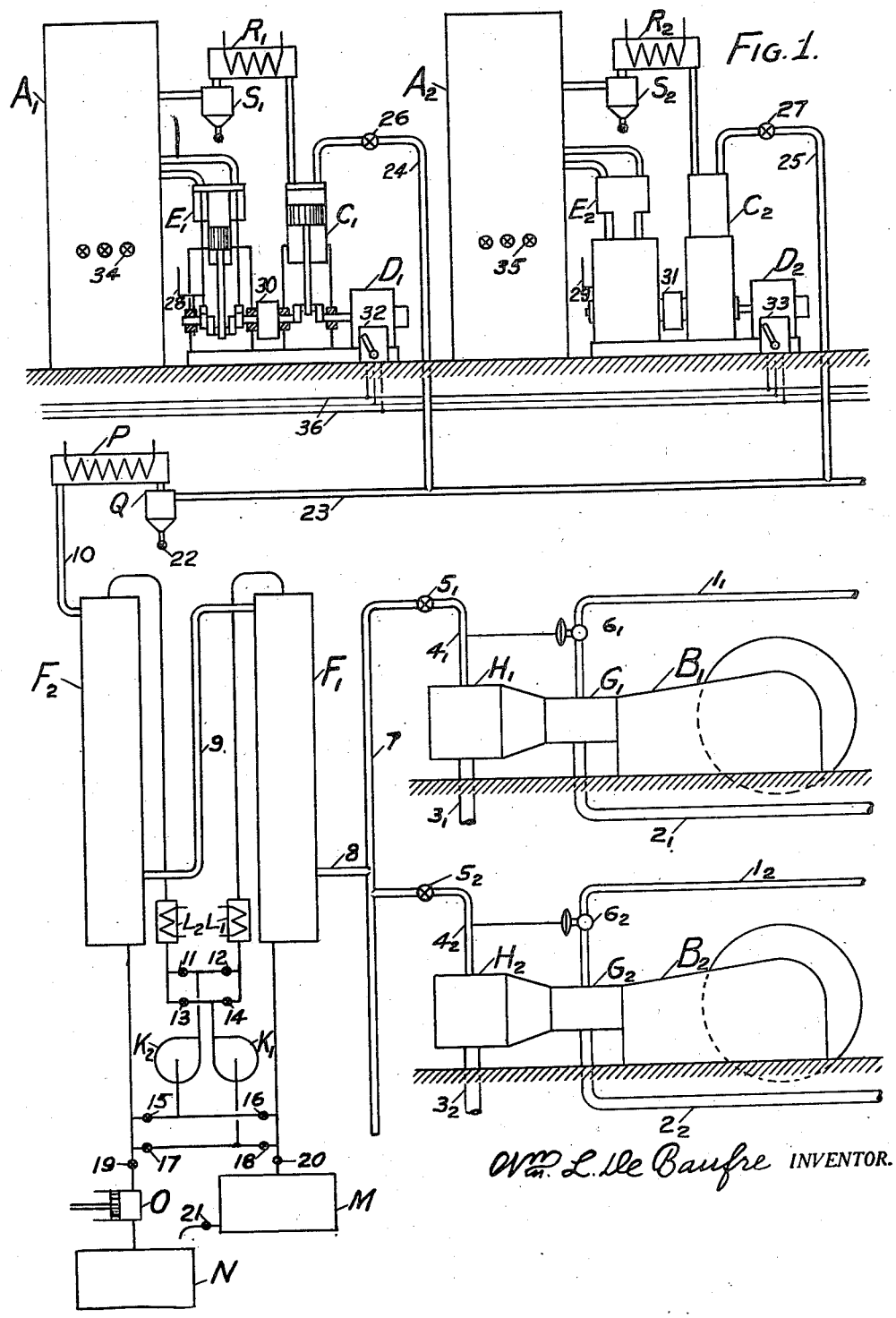

Aug. 30, 1938.   W. L. DE BAUFRE   2,128,692
METHOD AND APPARATUS FOR SEPARATING AIR
Filed Aug. 8, 1935   2 Sheets-Sheet 1

Wm. L. De Baufre INVENTOR.

Patented Aug. 30, 1938

2,128,692

UNITED STATES PATENT OFFICE 2,128,692

METHOD AND APPARATUS FOR SEPARATING AIR

William Lane De Baufre, Lincoln, Nebr.

Application August 8, 1935, Serial No. 35,351

33 Claims. (Cl. 62—175.5)

This invention relates to improvements in the art of separating air into more or less pure oxygen and nitrogen and is particularly applicable where two or more air separation units are used. However, certain features are applicable to a single separation unit and to the separating of other gaseous mixtures.

Heretofore, each air separation unit has been connected to an individual compressor for compressing from atmospheric pressure and supplying to the unit, compressed air which is to be separated into more or less pure oxygen and nitrogen. This arrangement has the disadvantage that any failure in a compressor results in shutting down the separation unit to which the compressor is connected. It would be advantageous to be able to operate any unit in a battery of separation units by any compressor in a group of compressors; but this is hardly feasible by reason of the complicated system of piping that would be required to connect any compressor to any separation unit with multiple separation units and multiple compressors compressing air from atmospheric pressure. It is impractical to connect all separation units and all such compressors to a common compressed air main, not only because the flows of air to the several separation units would not be in proportion to their respective capacities, but also because no common compressed air pressure would be suitable for all separation units.

The compressed air pressure to multiple separation units must vary from unit to unit with the refrigeration requirements of the individual units. Thus, at starting any unit, its refrigeration requirement is much higher than for another unit which has been in operation for some time. But even after a period of steady running, the refrigeration requirements vary from unit to unit, thereby requiring different compressed air pressures for multiple units. It is conceivable that the air might be compressed to the highest pressure required for any single unit and then be throttled to lower pressures for the remaining units; but this would be uneconomical in power consumption for compression. And even then, the mass flows of compressed air to the individual units would not be maintained at the respective capacities of the multiple separation units.

One object of the present invention is to proportion the mass flows of compressed air to the respective capacities of multiple separation units connected to a common compressed air main.

Another object of the invention is to adjust the compressed air pressures to multiple separation units connected to a common compressed air main in accordance with the individual requirements of the separation units.

Another object of the invention is to recover the mechanical power from expansion engines for supplying the refrigeration requirements of the multiple separation units and to utilize this mechanical power in further compressing the compressed air to the individual units.

Another object of the invention is to maintain the capacity of each expansion engine in proper relation to the capacity of the compressor for further compressing the compressed air to each separation unit.

Another object of the invention is to adjust this relation either at starting any separation unit or during normal operation, in order to meet the varying requirements of the individual separation units.

Another object of the invention is to purify the air to be separated of carbon dioxide while under the pressure in the compressed air main.

Figure 2:
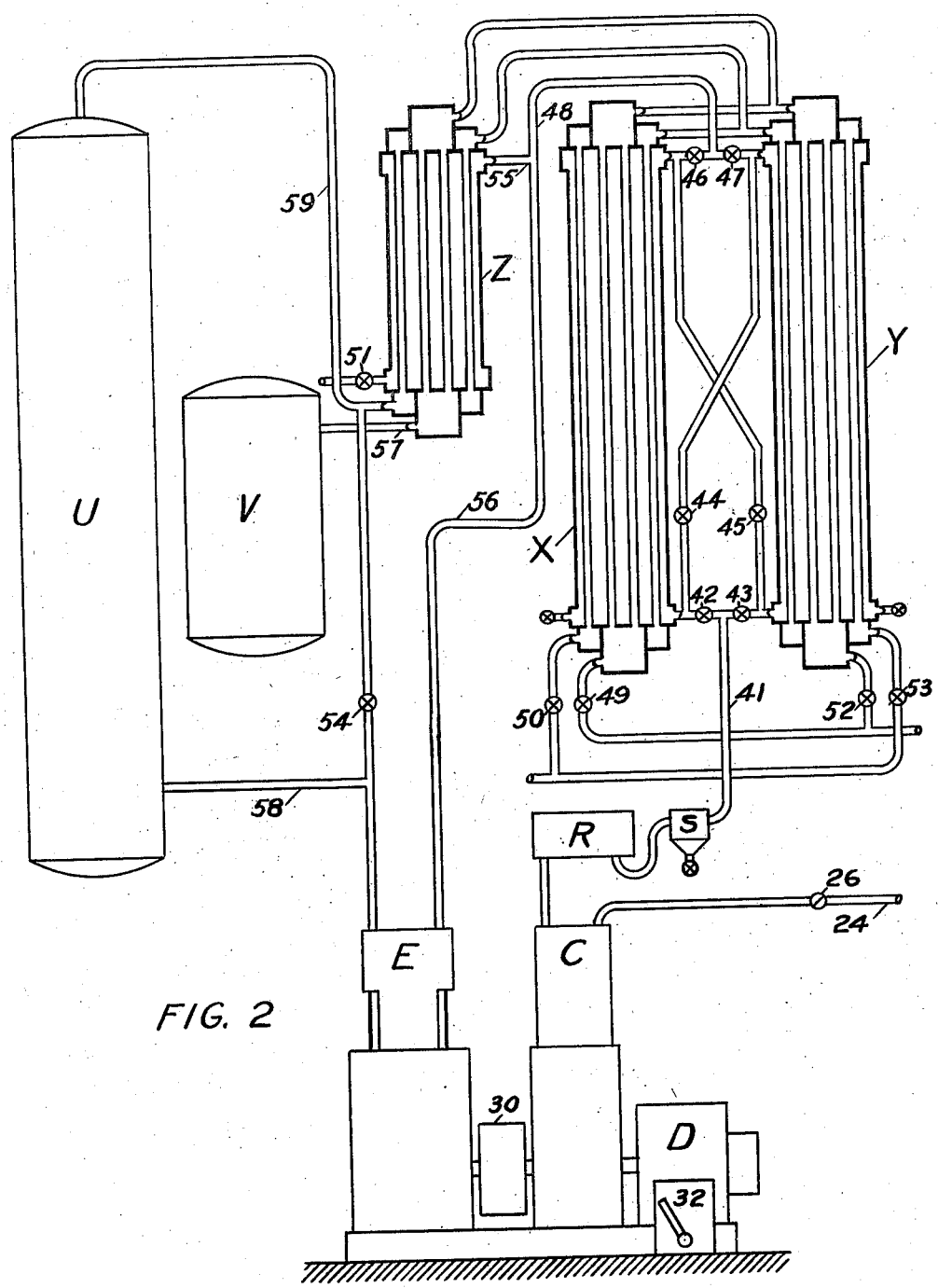

The foregoing, together with such other advantages as may hereinafter appear or are incident to the invention, are realized by the construction illustrated in preferred form in the drawings, wherein Fig. 1 shows the proposed schematic arrangement of multiple separation units and of multiple compressors all connected to a common compressed air main and Fig. 2 shows the arrangement of a single separation unit with expander-compressor-motor unit.

Referring to Fig. 1, $A_1$ and $A_2$ represent two air separation units of an installation of two or more such units. These units each include a rectifier for rectifying the air at very low temperatures into nearly pure oxygen and nitrogen and exchangers for cooling and partly liquefying the air to be rectified. The rectifier and exchangers are inclosed in insulation to reduce heat leak from the atmosphere, and a framework and casing is provided for supporting and protecting the insulated rectifier and exchangers. Such separation units may, for example, be arranged as shown in Fig. 1 of U. S. Patent No. 1,951,185, issued March 13, 1934. A similar arrangement is shown in Fig. 2 of this application.

The expansion engine D on the drawing in the patent referred to is not mounted within the separation units $A_1$ and $A_2$ of the present application, but is external thereto as shown at $E_1$ and $E_2$ in Fig. 1 for the two separation units respectively.

The air to be processed in separation units $A_1$, $A_2$, etc., is compressed by compressors $B_1$, $B_2$, etc.

The compressed air flows through a common compressed air main to carbon dioxide removal towers $F_1$ and $F_2$ and thence through another common compressed air main to the separation units. The air is compressed by compressors $B_1$, $B_2$, etc., to a pressure of say 150 lb. gage in the compressed air mains; while for the operation of the separation units, from 300 to 500 lb. gage is required depending upon the size of the units, whether they are starting or have been running for some time, and also upon the particular operating conditions for each unit. The boost in pressure from 150 lb. gage to the pressure required by each separation unit is obtained by means of compressors $C_1$, $C_2$, etc., which further compress the compressed air withdrawn from the compressed air main.

Expansion engines $E_1$, $E_2$, etc., are mechanically connected to compressors $C_1$, $C_2$, etc., which are mechanically connected to synchronous alternating current dynamos $D_1$, $D_2$, etc. The mechanical power consumed in driving compressors $C_1$, $C_2$, etc., is thereby obtained partly from dynamos $D_1$, $D_2$, etc., running as synchronous motors, and partly from the mechanical power produced by expansion engines $E_1$, $E_2$, etc., respectively. Should the mechanical power produced by any one of the expansion engines exceed the mechanical power consumed by the corresponding compressor, the excess mechanical power will drive the dynamo as a synchronous alternating current generator. Compressors $C_1$, $C_2$, etc., and expansion engines $E_1$, $E_2$, etc., will thus run at substantially constant speeds as determined by the frequency of the alternating current in the electrical supply circuits.

Compressors $B_1$, and $B_2$ are shown in the drawings as of the steam driven reciprocating type with steam cylinders $G_1$ and $G_2$ and with air cylinders $H_1$ and $H_2$. Steam is supplied through pipes $l_1$ and $l_2$ and is exhausted through pipes $2_1$ and $2_2$. Air is sucked through pipes $3_1$ and $3_2$ and is discharged through pipes $4_1$ and $4_2$ containing valves $5_1$ and $5_2$ respectively which may be closed when the compressors are shut down. Automatic control valves $6_1$ and $6_2$ are shown for maintaining a substantially constant pressure in compressed air main 7.

Any standardized method may be employed for maintaining a substantially constant pressure in compressed air main 7. Instead of throttling the steam pressure to reduce the speed of the compressor, the compressor may be run at constant speed and reduction in air flow obtained by automatic control of clearance pockets in the compressor cylinder, holding suction valves open for a period, etc. Electric motor or gas engine driven compressors may be used instead of steam driven compressors.

These main compressors will usually be two-stage compressors in order to obtain the higher efficiency of two-stage compression instead of single-stage compression to say 150 lb. gage. In large installations, turbo-blowers may be employed instead of reciprocating compressors to maintain a substantially constant compressed air pressure in main 7. While 150 lb. gage has been mentioned as the pressure in main 7, it may be desirable at times to utilize a compressed air pressure as low as 100 lb. gage or to go to a pressure as high as 200 lb. gage.

From compressed air main 7, the compressed air flows upwards through carbon dioxide removal towers $F_1$ and $F_2$ as indicated by pipe connections 8, 9 and 10. No after-coolers are shown for compressors $B_1$ and $B_2$ in order to indicate that the compressed air is not cooled before entering tower $F_1$. In flowing up through towers $F_1$ and $F_2$, the air is subjected to contact with down flowing solutions of caustic potash, circulated over the filling material within the towers by centrifugal pumps $K_1$ and $K_2$. With valves 11, 14, 15 and 18 open and valves 12, 13, 16 and 17 closed, pump $K_1$ circulates solution through tower $F_1$ while pump $K_2$ circulates solution through tower $F_2$.

The high pressure of the compressed air and the high temperature of compression both facilitate the chemical reaction of the caustic solution in absorbing carbon dioxide from the air to be separated into oxygen and nitrogen in comparison with the usual practice of treating the air at atmospheric pressure and temperature before entering the compressors. Another advantage of the arrangement shown is that purification from carbon dioxide can be accomplished at elevated pressure and temperature in a single set of towers. Exchangers $L_1$ and $L_2$ are provided for cooling the caustic solutions with water flowing through the coiled tubes indicated, should the temperatures of the towers rise too high without after coolers for the compressors.

The solution circulated through tower $F_1$ absorbs most of the carbon dioxide in the compressed air, which is then subjected to a final purification in tower $F_2$ with nearly pure solution. After a period of operation in this manner, pump $K_1$ is stopped and the partly spent solution within tower $F_1$ is drained out through valve 20 into tank M. Valves 14 and 18 are then closed. Valve 12 is opened and valve 11 closed in order to discharge the nearly pure solution from tower $F_2$ into tower $F_1$. Valve 15 is then closed and valve 16 opened to enable pump $K_2$ to circulate this solution through the filling material in tower $F_1$, absorbing most of the carbon dioxide from the compressed air. After opening valve 19, fresh solution from tank N is forced by pump O into tower $F_2$. Valve 19 is then closed. Valves 13 and 17 are now opened and pump $K_1$ started to circulate the fresh solution through the filling material within tower $F_2$ for the final purification of the compressed air from tower $F_1$. By this procedure, the compressed air is always subjected to fresh solution for its final purification.

The partly spent solution removed from tower $F_1$ through valve 20 may be revivified by use of lime in tank M and then be drained through valve 21 into tank N ready for pumping into tower $F_2$.

Instead of the towers shown on the drawings, equivalent means may be utilized in the compressed air main for removing carbon dioxide from the compressed air.

After leaving tower $F_2$, the compressed air is cooled in after cooler P by means of cooling water flowing through the pipe coil indicated therein. Condensed moisture is then separated from the compressed air in mechanical separator Q, the accumulated water being drained through valve 22. The cooled and dried carbon dioxide free compressed air then flows through main 23 to the several separation units.

A measured quantity of this compressed air is withdrawn from main 23 and supplied to each separation unit by means of reciprocating compressors $C_1$, $C_2$, etc., which have piston displacements at operating speed proportional respectively to the capacities of the separation units. Any other positive displacement device might be employed to withdraw compressed air from the compressed air main and supply it to the separation units in proportion to their respective capacities. A centrifugal type of blower would not withdraw a substantially constant volume of compressed air from the compressed air main irrespective of the final pressure required by the separation unit; but such a blower might be used in combination with a metering device to produce the same result as a positive displacement compressor. Even without a metering device, a centrifugal blower would have certain of the advantages claimed and might be employed under certain conditions.

Each of the positive displacement compressors $C_1$, $C_2$, etc., withdraws compressed air from the compressed air main 23 through pipes 24, 25, etc., and further compresses this air to the various operating pressures required for the several separation units $A_1$, $A_2$, etc. The operating pressure required for any one separation unit is determined by the part, or fraction, of the further compressed air that must pass through the expansion engine, $E_1$ or $E_2$. This engine is of the positive displacement type and cuts off the flow of further compressed air into the engine cylinder at a definite point in its stroke. At constant speed, therefore, a constant volume of further compressed air is taken in by the expansion engine and expanded in the same period of time. With a positive displacement compressor running at constant speed and withdrawing at constant pressure a constant volume of compressed air from the compressed air main in the same period of time, it is evident that the part, or fraction, of such compressed air that must enter the constant volume cut off in the expansion engine determines the final pressure to which the compressed air is further compressed. The temperature of the further compressed air entering the expansion engine also affects the final pressure of the compressed air.

In starting a separation unit which has been warmed up to room temperature for defrosting, the temperature of the further compressed air entering the expansion engine is much higher than after a period of operation when this air is cooled to one hundred or more degrees below zero centigrade in the exchangers of the separation unit as shown in Fig. 2. Hence, the final pressure of the further compressed air at starting will be much higher than during normal operation with conditions fixed as previously explained. A still higher pressure is reached at starting if all instead of part of the further compressed air is passed through the expansion engine with valve 51 closed in Fig. 2.

To prevent an excessive pressure of the further compressed air at starting, the portion of compressed air withdrawn from the compressed air main may be reduced by throttling through one of valves 26, 27, etc. Any other method of reducing the portion of compressed air withdrawn from the compressed air main by compressors $C_1$, $C_2$, etc., without reducing the volume of further compressed air taken in by expansion engines $E_1$, $E_2$, etc., may be employed. Thus, clearance pockets may be opened on one of the compressors, or the suction valves may be held open for a period, etc.

Instead of reducing the portion of compressed air withdrawn from the compressed air main by one of compressors $C_1$, $C_2$, etc., the displacement volume cut off in one of expansion engines $E_1$, $E_2$, etc., may be increased. This may be accomplished by varying the point of cut off by means of any well known mechanism for the purpose, as represented at 28, 29, etc. Or, the speed of the expansion engine may be varied relative to the speed of the compressor by some known form of speed changing mechanism, as represented by 30, 31, etc.

During normal operation, it is preferable to have valves 26, 27, etc. wide open and run without clearance pockets open, etc., in order to obtain maximum capacities of compressors $C_1$, $C_2$, etc., as being the most economical method of operation, and supplying to each separation unit $A_1$, $A_2$, etc., a constant mass of air to be separated. Varying conditions in the individual separation units may then be met by varying the point of cut off or relative speed of expansion engines $E_1$, $E_2$, etc., to compress $C_1$, $C_2$, etc.

Instead of a reciprocating type of engine, turbines can be used for expanding a part of the further compressed air and providing refrigeration necessary in cooling and rectifying the air within separation units $A_1$, $A_2$, etc. The operating pressures would then be determined by the nozzle areas through the several turbines. Changing the nozzle area for any turbine would correspond to changing the point of cut off or the speed of a reciprocating engine. Changing the speed of the turbine would not change the flow of compressed air through the turbine. Under certain conditions, a turbine would be preferable to a reciprocating engine and a number of the advantages claimed could be obtained with a turbine combined with a reciprocating compressor, or even combined with a centrifugal blower.

Without any change in the point of cut off or relative speed of a reciprocating expansion engine (or without any change in the nozzle area through a turbine), the part, or fraction, of the further compressed air passing through the expander may be changed by manipulating the valves controlling conditions within the separation unit. Thus, in the type of separation unit shown in Fig. 1 of U. S. Patent 1,951,185, manipulation of valve 29 to change the flow of more or less liquefied air through liquefier C will change the fraction of compressed air flowing through engine D. In Fig. 1 of the present application, the right hand one of the three control valves 34, 35, etc., corresponds to valve 29 in the above patent. In Fig. 2, the corresponding valve is designated 51.

By any one or more of the methods described, the energy removed from the expanding air in expanders $E_1$, $E_2$, etc., may be closely adjusted to the refrigeration requirements of the individual separation units $A_1$, $A_2$, etc.

In further compressing the compressed air from main 23 before supplying it to the several separation units, the temperature of the air is raised. It is desirable to cool the further compressed air in after coolers $R_1$, $R_2$, etc., and to remove the excess moisture in mechanical separators $S_1$, $S_2$, etc., in order to improve the efficiency of operation of the separation units $A_1$, $A_2$, etc.

Dynamos $D_1$, $D_2$, etc., are connected to three phase electrical supply mains 36 through starting controllers 32, 33, etc. The dynamos are represented as synchronous alternating current machines with direct current exciters mounted on the same shafts. They would probably be arranged to start as induction motors and then operate as synchronous machines at full speed. As synchronous machines, they would run at constant speed corresponding to a constant frequency of the alternating current supply mains. Thus, compressors $C_1$, $C_2$, etc., and expanders $E_1$, $E_2$, etc., would also run at constant speeds. With direct current instead of alternating current supply mains, direct current dynamos could be used having a nearly constant speed characteristic whether operating as a motor or as a generator.

Fig. 2 has been included in the present application to show the relation between the expander-compressor-motor unit and the exchangers of the separation unit. The rectifier U with exchanger V are shown in outline only; reference may be made to U. S. Patent 1,951,185 for a more detailed description of these parts of the separation unit. Interchangers X and Y and liquefier Z are shown more in detail.

Air compressed to the necessary operating pressure enters the separation unit at the air inlet 41 after being further compressed in compressor C, cooled approximately to room temperature in after-cooler R and having excess moisture separated therefrom in mechanical separator S. With valves 42, 45 and 47 open and valves 43, 44 and 46 closed, the compressed air passes up through interchanger X and then up through interchanger Y, leaving the latter through pipe 48. Valves 49 and 50 should be closed and valves 52 and 53 open. Then the nitrogen from the rectifying column U and the oxygen from the exchanger V will be returning through interchanger Y and not through interchanger X. In interchanger Y, the compressed air will be cooled by the returning oxygen and nitrogen.

After leaving interchanger Y through pipe 8, the compress air divides, part going through pipe 55 to liquefier Z while the larger portion passes to expansion engine E through pipe 56. The portion entering the liquefier is more or less liquefied therein by nitrogen and oxygen returning from rectifier U and exchanger V through pipes 59 and 57 respectively. The portion of the compressed air passing to expansion engine E is expanded therein and from thence passes through pipe 58 to rectifier U.

A by-pass valve 54 is provided between the expansion engine exhaust pipe 58 and the return pipe 59 from rectifier U to liquefier Z. A certain length of time will be required to cool down the apparatus to operating temperatures. Before starting the expander-compressor-motor unit, by-pass valve 54 is opened. Valve 51 should be closed. Valves 42, 45, 47, 52 and 53 may be open while valves 43, 44, 46, 49 and 50 may be closed to have the compressed air pass through interchanger X before passing through interchanger Y.

The expander-compressor-motor unit is then started. Most if not all of the air after expansion passes through by-pass valve 54 and returns through liquefier Z and interchanger Y. By expansion, the temperature of the compressed air is reduced and the cooled returning air cools liquefier Z and interchanger Y. The temperatures quickly drop until liquid air temperature under the compressed air pressure is reached in liquefier Z. Accumulated liquid air is throttled through valve 51 to whatever point in rectifier U the pipe shown broken is connected. After considerable accumulation of liquid has occurred, valve 54 is gradually closed to get the plant into normal operation.

During normal operation of an air separating plant comprising multiple compressors and multiple separation units with individual expanders and auxiliary compressors as shown in the drawings and described above, the main compressors would be run to give a substantially constant compressed air pressure in mains 7 and 23. The number of main compressors would be determined by the number of separation units to be operated. One of the advantages of this arrangement is that any main compressor can be replaced by another compressor without materially affecting the operation of the separation units. Automatic control of the compressed air pressure is desirable although the system can be operated without this feature.

The compressed air is purified of carbon dioxide and then cooled and dried in apparatus wherein spent solution is replaced by fresh solution and revivified from time to time.

The expander-compressor-motor units are run at constant speed, withdrawing from compressed air main 23, portions of compressed air in proportion to the capacities of separation units $A_1$, $A_2$, etc., further compressing these portions to higher pressures suitable for the individual units and expanding parts of these portions to provide refrigeration necessary in the separation units. Should an increase or decrease of accumulated liquids in a separation unit indicate the need of decreasing or increasing the refrigeration supplied by one of expanders $E_1$, $E_2$, etc., this is accomplished ordinarily by adjusting control valves 34, 35, etc. Should the need for change be beyond the adjustment of these control valves, further adjustment may be obtained by means of varying cut-off mechanisms 28, 29, etc., or varying speed ratio mechanisms 30, 31, etc.

Separation unit $A_1$ may be shut down by stopping motor $D_1$ and closing valve 26, then shutting down one or more compressors $B_1$, $B_2$, etc. After this separation unit has been defrosted, it may be put into operation again by starting motor $D_1$ and slightly opening valve 26 to permit a reduced flow of compressed air to unit $A_1$, an additional compressor $B_1$, $B_2$, etc., having been started to supply the additional compressed air needed. Valve 26 is gradually opened as separation unit $A_1$ cools down and the final compression pressure drops with cooling of the air to expander $E_1$. When separation unit is fully in operation, valve 26 is opened wide.

I claim:

1. Method of separating air into components by cooling and rectifying said air in multiple portions which includes compressing said air to a higher pressure, withdrawing multiple portions at said higher pressure, maintaining the mass flow of each portion substantially constant, further compressing each portion, and expanding part of each portion to furnish refrigeration necessary in cooling and rectifying such portion.

2. Method of separating air into components as in claim 1 which includes cooling each portion of further compressed air by heat exchange with said components before expanding part of each portion.

3. Method of separating air into components as in claim 1 which includes adjusting independently the final pressure of each portion of compressed air withdrawn whereby the refrigeration furnished by expanding part of each portion is made substantially equal to the refrigeration required in cooling and rectifying such portion.

4. Method of separating air into components as in claim 1 which includes adjusting the part of each portion expanded whereby the refrigeration furnished by expanding said part is made substantially equal to the refrigeration required in cooling and rectifying such portion.

5. Method of separating air into components as in claim 1 which includes removing carbon dioxide from the compressed air while under said common pressure before withdrawing said multiple portions.

6. Method of separating air into components as in claim 1 which includes maintaining said common pressure substantially constant before withdrawing said multiple portions of the compressed air.

7. Method of separating air into components as in claim 1 which includes reducing independently each portion of compressed air withdrawn, whereby an excessive final pressure is avoided in further compressing any portion and in expanding a large part of such portion from a relatively high temperature at starting said cooling and rectifying.

8. Method of separating air into components as in claim 1 which includes utilizing in further compressing each portion of compressed air, mechanical power produced in expanding part of such portion.

9. Method of separating air into components by cooling and rectifying the air, which includes compressing said air, further compressing the compressed air, cooling the compressed air by heat exchange with said components, subsequently expanding part of the further compressed and cooled air to furnish refrigeration necessary in cooling and rectifying, and utilizing in further compressing said compressed air mechanical power produced in expanding part of the further compressed air.

10. Method of separating air into components by cooling and rectifying said air, which includes compressing said air to a pressure of 100 to 200 lb. per sq. inch, further compressing said air to a pressure of less than 500 lb. per sq. inch, maintaining the volume flow of compressed air substantially constant, expanding part of the further compressed air to furnish refrigeration in cooling and rectifying, and utilizing in further compressing said compressed air mechanical power produced in expanding part of the further compressed air.

11. Method of cooling an air separation plant to operating temperatures, which includes compressing air, further compressing the compressed air, cooling the further compressed air, subsequently expanding part of the further compressed and cooled air with performance of external work, utilizing the expanded part to liquefy the remainder of the further compressed and cooled air and also to effect the said cooling of the further compressed air, utilizing said external work in further compressing said compressed air, and utilizing the liquefied air to cool the air separation plant.

12. Method of separating air into components by cooling and rectifying the air which includes compressing said air, further compressing the compressed air with consumption of mechanical power, expanding part of the further compressed air with production of mechanical power to furnish refrigeration necessary in cooling and rectifying, and balancing by electrical power equivalent to the difference between the mechanical power consumed in further compressing said compressed air and the mechanical power produced in expanding part of the further compressed air.

13. Method of separating air into components by cooling and rectifying the air which includes compressing said air, further compressing a constant volume per unit time of the compressed air, expanding part of the further compressed air to furnish refrigeration necessary in cooling and rectifying, and adjusting the volume of said part before expansion relative to the volume of the compressed air before further compressing whereby the refrigeration furnished by expanding said part is made substantially equal to the refrigeration required in cooling and rectifying.

14. Apparatus for separating air into components including separation units in multiple for cooling and rectifying said air, a compressed air main, means for compressing said air and supplying it to said main, and means for withdrawing from said main portions of compressed air proportional respectively to the capacities of said separation units and at substantially constant rates of mass flow.

15. Apparatus for separating air into components including separation units in multiple for cooling and rectifying said air, a compressed air main, means for compressing said air and supplying it to said main, means for withdrawing from said main portions of compressed air proportional respectively to the capacities of said separation units, means for maintaining the mass flow of each portion substantially constant, and means for further compressing each portion of compressed air withdrawn.

16. Apparatus for separating air into components including separation units in multiple for cooling and rectifying said air, a compressed air main, means for compressing said air and supplying it to said main, means for withdrawing from said main portions of compressed air proportional respectively to the capacities of said separation units, means for maintaining the mass flow of each portion substantially constant, means for further compressing each portion of compressed air withdrawn, and means for expanding part of each portion to furnish refrigeration necessary in cooling and rectifying such portion.

17. Apparatus for separating air into components as in claim 16 including means for varying the mass flow of the part expanded relative to each portion of compressed air withdrawn from said main.

18. Apparatus for separating air into components including a separation unit for cooling and rectifying said air, a compressed air main, a compressor for compressing said air and supplying it to said main, a second compressor for withdrawing compressed air from said main and further compressing it, means for supplying the further compressed air to said separation unit, an expander for expanding part of the further compressed air to furnish refrigeration necessary in cooling and rectifying said air, means for running said second compressor at substantially constant speed, and means for running said expander at a constant speed ratio to said second compressor.

19. Apparatus for separating air into components as in claim 18 including means for changing said speed ratio.

20. Apparatus for separating air into components as in claim 18 including means for changing the volume flow of further compressed air to said expander.

21. Apparatus for separating air into components as in claim 18 including means for changing the mass flow of compressed air through said second compressor.

22. Apparatus for separating air into components including a separation unit for cooling and rectifying said air, a compressed air main, a compressor for compressing said air and supplying it to said main, a second compressor for withdrawing compressed air from said main and further compressing it, means for supplying the further compressed air to said separation unit, an expander for expanding part of the further compressed air to furnish refrigeration in cooling and rectifying said air, a dynamo running at substantially constant speed and mechanically connected to said second compressor and said expander whereby said second compressor and said expander run at substantially constant speeds.

23. Apparatus for separating air into components as in claim 22 wherein said dynamo is of the alternating current synchronous type and runs either as a motor or generator at synchronous speed corresponding to the frequency of the electrical supply circuit.

24. Apparatus for separating air into components including a separation unit for cooling and rectifying said air, a compressed air main, means for compressing said air and supplying it to said main, a positive displacement compressor for withdrawing compressed air from said main and further compressing it, means for running said positive displacement compressor at substantially constant speed, means for supplying the further compressed air to said separation unit, and an expander for expanding part of the further compressed air to furnish refrigeration in cooling and rectifying said air.

25. Apparatus for separating air into components as in claim 24 including means for throttling the flow of compressed air from said main to said positive displacement compressor.

26. Apparatus for separating air into components as in claim 24 wherein said expander is of the positive displacement type and cuts off the flow of further compressed air into said expander at a point in its stroke, and means for varying the point of cut off.

27. Apparatus for separating air into components as in claim 24 including an interchanger for cooling the further compressed air by heat exchange with said components before expanding part of the further compressed air in said expander.

28. Apparatus for separating air into components including separation units in multiple for cooling and rectifying said air, compressors in multiple for compressing said air, a compressed air main connected to said compressors, and positive displacement means for withdrawing compressed air from said compressed air main and supplying air to said separation units in proportion to the capacities of said separation units and at substantially constant mass flows.

29. Apparatus for separating air into components as in claim 28 including means for maintaining a substantially constant pressure in said compressed air main.

30. Apparatus for separating air into components as in claim 28 including means for reducing the quantity of compressed air supplied to any one separation unit below the capacity of said unit.

31. Apparatus for separating air into components as in claim 28 including means in said compressed air main for removing carbon dioxide from the compressed air flowing from said multiple compressors to said multiple separation units.

32. Apparatus for separating air into components including a separation unit, means for compressing said air, means for bringing the compressed air into contact with a solution for absorbing carbon dioxide therefrom at about the temperature of compression, subsequent means for cooling the compressed air approximately to room temperature and removing moisture therefrom followed by means for further compressing the compressed air before admitting said air to said separation unit.

33. Apparatus for separating air into components including a separation unit, means for compressing said air, means for bringing the compressed air at about the temperature of compression into contact with a solution for absorbing carbon dioxide therefrom, means for cooling said solution, whereby the compressed air is simultaneously cooled and purified of carbon dioxide, means for further comprising the cooled and purified compressed air, and means for admitting the cooled and purified and further compressed air to said separation unit.

WILLIAM LANE DE BAUFRE.